United States Patent
Chu et al.

(10) Patent No.: US 10,683,842 B2
(45) Date of Patent: Jun. 16, 2020

(54) WIND TURBINE YAW CONTROL METHOD AND SYSTEM

(71) Applicant: GUODIAN UNITED POWER TECHNOLOGY COMPANY LIMITED, Beijing (CN)

(72) Inventors: Jingchun Chu, Beijing (CN); Ling Yuan, Beijing (CN); Xingjian Wu, Beijing (CN); Jian Feng, Beijing (CN)

(*) Notice: Subject to any disclaimer, the term of this patent is extended or adjusted under 35 U.S.C. 154(b) by 596 days.

(21) Appl. No.: 15/320,321

(22) PCT Filed: Dec. 8, 2014

(86) PCT No.: PCT/CN2014/001105
§ 371 (c)(1),
(2) Date: Dec. 20, 2016

(87) PCT Pub. No.: WO2016/058115
PCT Pub. Date: Apr. 21, 2016

(65) Prior Publication Data
US 2017/0198680 A1    Jul. 13, 2017

(30) Foreign Application Priority Data
Oct. 15, 2014    (CN) .......................... 2014 1 0543444

(51) Int. Cl.
*F03D 7/02* (2006.01)
*F03D 7/04* (2006.01)

(52) U.S. Cl.
CPC ........... *F03D 7/0204* (2013.01); *F03D 7/028* (2013.01); *F03D 7/0276* (2013.01); *F03D 7/046* (2013.01);
(Continued)

(58) Field of Classification Search
CPC ...... F03D 7/0204; F03D 7/0276; F03D 7/028; F03D 7/046; F05B 2270/32; F05B 2270/329; Y02E 10/723
(Continued)

(56) References Cited

U.S. PATENT DOCUMENTS 4,321,005 A * 3/1982 Black .................... F03D 3/02
415/4.2
5,140,856 A * 8/1992 Larsen .................... G01M 1/28
416/144
(Continued)

OTHER PUBLICATIONS

Nguyen, Hoa & Naidu, Desineni. (2013). Evolution of Wind Turbine Control Systems.*

*Primary Examiner* — David Hamaoui
*Assistant Examiner* — John D Bailey
(74) *Attorney, Agent, or Firm* — Prakash Nama; Global IP Services, PLLC

(57) ABSTRACT

The present invention discloses a wind turbine yaw control method and system, the method comprising the following steps: establishing a reference model, giving the optimal yaw reference model different wind speeds for wind shift angles; using model reference adaptive control; getting the adaptive control input so that the difference between the actual yaw angle deviation of the wind and the optimal wind yaw angle deviation is at a minimum. The wind turbine yaw control method and system of the present invention can adaptively track the wind speed in different sections of the optimum wind yaw deviation, improve operating performance under the influence of factors such as wind direction measurement and bias of the yaw system in order to achieve maximum efficiency absorption of wind energy, as well as optimize wind turbine power generation to improve economic efficiency and the operation of the entire wind farm.

2 Claims, 1 Drawing Sheet

(52) U.S. Cl.
CPC ..... *F05B 2270/32* (2013.01); *F05B 2270/329* (2013.01); *Y02E 10/723* (2013.01)

(58) Field of Classification Search
USPC .......................................................... 415/1
See application file for complete search history.

(56) References Cited

U.S. PATENT DOCUMENTS

| | | | | |
|---|---|---|---|---|
| 5,483,446 A * | 1/1996 | Momose | ................ | F16H 59/00 701/1 |
| 6,320,272 B1 * | 11/2001 | Lading | ................ | F03D 7/0224 290/44 |
| 7,175,389 B2 * | 2/2007 | Moroz | ................ | F03D 7/0204 290/55 |
| 7,415,446 B2 * | 8/2008 | Cheng | ................ | G05B 13/021 706/23 |
| 7,436,083 B2 * | 10/2008 | Shibata | ................ | F03D 7/0204 290/44 |
| 8,109,722 B2 * | 2/2012 | Gamble | ................ | F03D 1/0658 416/1 |
| 9,181,925 B2 * | 11/2015 | von Mutius | ........ | F03D 7/0204 |
| 9,217,416 B2 * | 12/2015 | Spruce | ................ | F03D 7/0224 |
| 9,273,668 B2 * | 3/2016 | Bjork | ................ | F03D 7/0204 |
| 9,316,205 B2 * | 4/2016 | Baker | ................ | F03D 9/17 |
| 9,347,430 B2 * | 5/2016 | Abdur-Rahim | ....... | F03D 7/0224 |
| 9,388,792 B2 * | 7/2016 | Baker | ................ | F03D 7/04 |
| 9,488,157 B2 * | 11/2016 | Baker | ................ | F03D 7/022 |
| 9,617,975 B2 * | 4/2017 | Attia | ................ | F03D 7/0204 |
| 9,728,969 B2 * | 8/2017 | Tarnowski | ........... | F03D 7/0272 |
| 9,784,241 B2 * | 10/2017 | Blom | ................ | F03D 7/045 |
| 9,790,924 B2 * | 10/2017 | Bayon | ................ | F03D 17/00 |
| 9,817,375 B2 * | 11/2017 | Li | ................ | F24F 11/30 |
| 10,294,921 B2 * | 5/2019 | Bonding | ................ | F03D 7/044 |
| 2005/0046375 A1 * | 3/2005 | Maslov | ................ | B60L 8/00 318/650 |
| 2009/0068013 A1 * | 3/2009 | Birkemose | ........... | F03D 7/0204 416/31 |
| 2010/0054941 A1 * | 3/2010 | Hoffmann | ........... | F03D 7/0204 416/61 |
| 2010/0066087 A1 * | 3/2010 | Hayashi | ................ | F03D 7/0204 290/44 |
| 2012/0051907 A1 * | 3/2012 | Rogers | ................ | F03D 7/0224 416/1 |
| 2012/0326443 A1 * | 12/2012 | Vince | ................ | F01D 15/10 290/7 |
| 2013/0268131 A1 * | 10/2013 | Venayagamoorthy | .... | G05F 5/00 700/286 |
| 2014/0003939 A1 * | 1/2014 | Adams | ................ | F03D 7/0224 416/1 |
| 2014/0167415 A1 * | 6/2014 | Mykhaylyshyn | ........ | F03D 7/02 290/44 |
| 2014/0169964 A1 * | 6/2014 | Kumar | ................ | F03D 7/0224 416/1 |
| 2014/0219795 A1 * | 8/2014 | Honhoff | ................ | F03D 7/0204 416/1 |
| 2014/0339828 A1 * | 11/2014 | Peiffer | ................ | B63B 1/107 290/44 |
| 2015/0147174 A1 * | 5/2015 | Couchman | ........... | F03D 7/047 416/1 |
| 2016/0215759 A1 * | 7/2016 | Fleming | ................ | F03D 7/046 |
| 2018/0017039 A1 * | 1/2018 | Davoust | ................ | F03D 7/04 |

\* cited by examiner

WIND TURBINE YAW CONTROL METHOD AND SYSTEM

BACKGROUND OF THE INVENTION

The present invention relates to the field of wind power technology, in particular to a wind turbine yaw control method and system.

China's wind energy resource-rich development potential, through large-scale in the mountains, coastal areas and other wind farm 10 mold build wind turbine base, you can take advantage of wind energy, creating significant economic value.

Wind turbine wind turbines wind energy absorbing rotation, then drive a generator connected to the rotating power. Wind turbine yaw system can track changes in wind direction, wind turbine nacelle drive rotation around the tower, so that the wind swept surface and the wind wheel vertical. Existing wind turbine yaw system of the wind deviation zero setting targets, thus theoretically achieve maximum wind energy absorption. However, by 15 wind farms in complex terrain, the arrangement of a plurality of wind turbines and wind turbine vane measurement error and other factors affecting the wake caused yaw wind speeds at different segments of the wind turbines wind did not reach zero deviation maximum energy absorption, which causes loss of turbine power generation, which affect the performance of the entire unit.

Therefore, the creation of a yaw can adaptively track the wind speed at different segments of the advantages of wind deviation, 20 improvements in operating performance under the influence of factors such as wind direction measurement bias yaw system, to the greatest wind energy absorption efficiency, increase the fan power power and economic benefits of the entire wind farm wind turbine yaw control method and system is important.

BRIEF SUMMARY OF THE INVENTION

Object of the present invention is to provide a wind turbine yaw control method, it can adaptively track the operation of the wind yaw deviation optimum, improved under the influence of wind direction and other factors of the yaw measurement bias system in different wind speeds segments properties, to the greatest wind energy absorption efficiency, improve turbine power generation, thereby overcoming the conventional yaw system under the influence of wind direction and other factors in the measurement error of 5 different wind speed is established when the deviation of the wind does not reach zero degrees maximum wind energy absorption, thus resulting in insufficient power generation turbine loss.

To achieve the above object, the present invention adopts the following technical scheme:

A wind turbine yaw control method comprising the steps of: A reference model for the establishment of the optimal yaw reference model given under different wind wind deviation angle; B using model reference adaptive control, access, for outputting to the adaptive said wind turbine yaw control execution system control input, so that the actual yaw angle of the wind and the deviation of the optimal yaw angle difference between the minimum deviation between the wind.

A wind turbine yaw control method comprising the steps of: A reference model for the establishment of the optimal yaw reference model given under different wind wind deviation angle; B 10 using model reference adaptive control, access. for outputting to the adaptive said wind turbine yaw control execution system control input, so that the actual yaw angle of the wind and the deviation of the optimal yaw angle difference between the minimum deviation between the wind.

Further, the step A reference model for a given wind speed under different optimal yaw angle of the wind deviation obtained by the following steps:

A1: Get wind signal $d_1$, wind speed signal, the yaw angle signal $d_2$ and power generation signal;

A2: wind direction in accordance with the signal d1 the yaw angle signal $d_2$, calculated yaw angle of the wind deviation d: $d=d_1-d_2$;

A3: Statistical analysis of the wind speed signal, the signal and power generation wind yaw angle deviation obtained under different wind power generation signal to get the most optimal wind yaw angle deviation.

Further, the step (B) of the adaptive control input is obtained by:

B1: set the yaw system state equations for wind turbines:

$$\dot{x}_p = -a_p x_p + b_p u \tag{1}$$

Which, $x_p$ actual yaw deviation angle to the wind, $\dot{x}_p$ for $x_p$ differential $a_p b_p$, for the system Matrix, the control input u for the state equation;

The reference model equation of state:

$$\dot{x}_m = -a_m x_m + b_m r \tag{2}$$

Which, $x_m$, for optimal wind yaw angle deviation, $\dot{x}_m$ for $x_m$ differential, $a_m b_m$, for the system matrix, r control input for the equation of state;

B2: parameter error is defined as follows:

$$e = x_m \times x_p \tag{3}$$

According to the model reference adaptive control, by making the actual wind yaw angle deviation $x_p$ and optimal wind yaw angle deviation $x_m$. The difference e between the two is minimized to obtain the adaptive control input, and opt wind yaw angle deviation:

$$u = F x_p + K r \tag{4}$$

Where F is a feedback gain, K is the feedforward gain, $$F = \int_0^1 \mu_1 e x_p \tag{5}$$

$$K = \int_0^1 \mu_2 e r \tag{6}$$

Wherein: 1μ, 2μ system for tracking error according to the response speed set by matrix coefficients.

Another object of the present invention is to provide a method of applying the wind turbine yaw system control system 15, using the following technical solution:

Applying the wind turbine yaw control method of the wind turbine yaw control system, the system comprising: a reference model module for establishing a reference model, the reference model is optimal for a given wind speed under different yaw wind deviation angle; a yaw adaptive control module for the use of model reference adaptive control, access to the adaptive yaw control for the output of the wind turbine system to perform 20 control inputs, so that the difference between the actual yaw deviation of the wind and the optimal yaw angle of the wind angle is the smallest.

As a result of the technical proposal, the at least the invention ha following advantages:

Wind turbines due to changes in wind speed and wind effects will cause wake effects of wind yaw deviation, resulting in the loss of power generation. The wind turbine yaw control method of the present invention can measure and analyze to obtain optimum yaw deviation of the wind, and test the yaw control system using model reference adaptive control mode, performance does not need to be transformed, the system is easy to implement since there is a fast speed of adaptation. Using model reference adaptive control system for wind turbine yaw control, the yaw motion of the wind can track the optimal wind yaw deviation in the case of changes in the external environment, including wind conditions, to meet the performance requirements of the control system to improve the wind turbine power generation.

BRIEF DESCRIPTION OF THE DRAWINGS

The summary of the invention described above rely one technical solution, in order to more clearly understand the technical means of the present invention, the following drawings in conjunction with the specific embodiments of the present invention will be further described in detail.

DETAILED DESCRIPTION OF THE INVENTION

Figure 1:
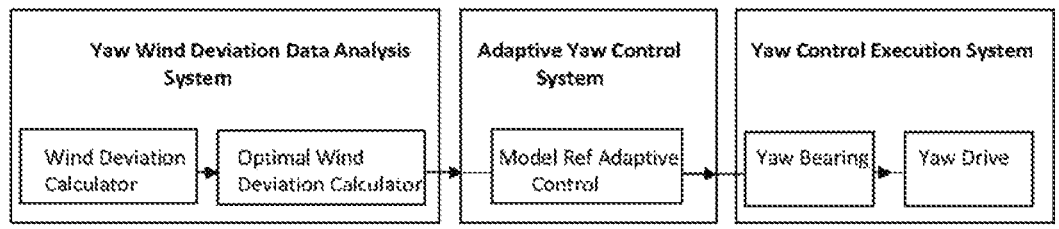
FIG. 1 is a wind turbine yaw control system structure diagram of the present invention.

Refer to FIG. 1, a wind turbine yaw control system of the present invention, including a yaw wind deviation data analysis system, an adaptive control system yaw and a yaw control execution system.

Among them, the yaw deviation for wind data analysis system includes the most advantage in the wind deviation calculator, the yaw adaptive control system 20 includes a model reference adaptive control, yaw control system, including the implementation of the yaw bearing and yaw drive. After the wind passed to yaw deviation, optimum operation of the output of the model reference adaptive controller is connected to the model reference adaptive controller control signal to drive, drive control yaw yaw bearing to perform an action.

The biggest advantage of the wind deviation calculators the obtaining of the optimal yaw angle deviation under different wind speed signals according to the wind, wind speed signal, the yaw angle signal. Upon generating a power signal, the signal travels through the vane, anemometer and yaw encoders and a variable current is measured.

Specifically, first by measuring a vane mounted on the wind turbine nacelle of the wind. Vane at tail, counterweight, point rods, rotating shaft composed of four parts. Vane is an asymmetric shaped object, the center of gravity point 5 is fixed on the vertical axis. When the wind blows, one end of the air flow will have a greater resistance to wind rotation to measure the wind direction signal obtained d1. Furthermore anemometer is used to measure wind speed signal, the anemometer consists of three parabolic cone empty cups arranged under the influence of wind, the wind cups around the axis of rotation are proportional to the wind speed, thereby measuring the wind speed. Yaw angle is measured by the yaw signal d2 encoder, the encoder by yaw control switch with the worm counter configuration. Power generation as measured by the converter. The converter consists of AC-DC conversion circuit consisting of 10 channels which can be used to measure wind turbine power generation.

After obtaining wind and wind speed, the wind power signal is passed to the most advantage of operator error. The operator first calculates wind yaw angle deviation d:

$$d = d_1 - d_2 \tag{1}$$

Then the wind speed signal, the yaw angle and the deviation of the wind power signals for statistical analysis, 15 at each wind speed signal can be obtained from the maximum power of the optimal yaw angle deviation wind $x_m$. Segment in different wind speeds, wind power signals can be affected through the impact of blade wake effects, leading to the corresponding optimal yaw wind deviation signal value being changed. After these calculations, the method includes obtaining the optimal yaw angle deviation under different wind, and accordingly establishing a reference model, the optimal wind yaw angle deviation for the yaw system as a model reference adaptive control signal for self-adaptive control.

Yaw control system uses an adaptive model reference adaptive control approach, which is characterized by performance indicators that do not need to change, and are easy to implement, adaptive speed. Due to the mathematical model of the wind turbine yaw system is difficult to determine in advance, and with changes in wind speed, yaw control system parameters are constantly changing, therefore with the conventional control it is difficult to achieve a good control effect, these aspects can be handled by the model reference self-adaptive control and it does not require the controlled object online identification.

The parameter model reference adaptive controller system include changing object properties which are changed with the environment constantly adjusted so that the yaw control system has a strong ability to adapt to changes in parameters such that the yaw control system, when the partial air control system follows these changes, reaches a target value of the yaw drive wind deviation signal.

Figure 2:
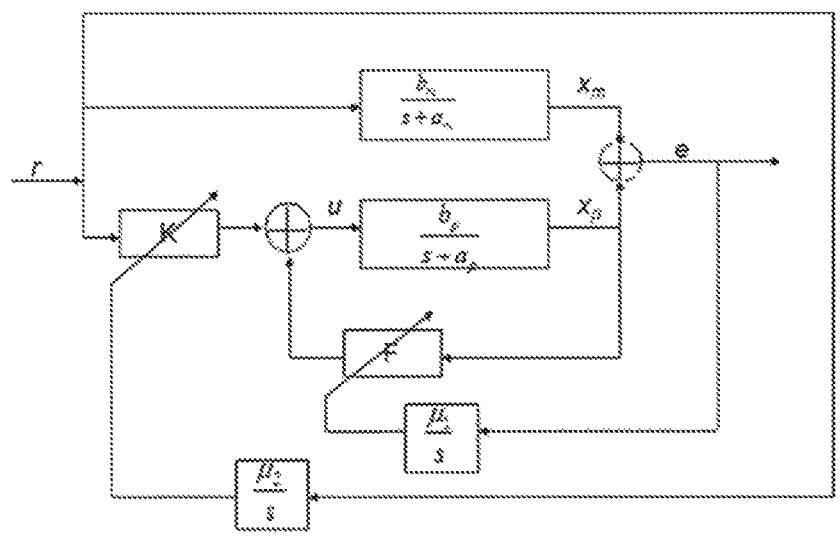
FIG. 2 is a schematic diagram of yaw adaptive control system based on model reference adaptive control.

Yaw model reference adaptive control system shown in FIG. 2, the figure for the Laplace transform operator a five children, yaw system state equations for wind turbines:

$$\dot{x}_p = -a_p x_p + b_p u \tag{2}$$

In the above formula, $x_p$ is actual yaw system for wind angle deviation, $\dot{x}_p$ for $x_p$ is differential, $a_p, b_p$, is for the system matrix, u is the equation of state for the control inputs.

Design reference model state equation is:

$$\dot{x}_m = -a_m x_m + b_m r \tag{3}$$

The above equation, $x_m$ for optimal wind yaw angle deviation, as yaw model reference adaptive contra of the target signal. $\dot{x}_m$ for $x_m$ differential, $a_m, b_m$, for the system matrix, r control input for the equation of state.

The definition of the parameters of error is:

$$e = x_m - x_p \tag{4}$$

Model reference adaptive control theory shows that, by e minimized, you can get the 15-system of adaptive control based on control input:

$$U = F x_p = K r \tag{5}$$

Where F is a feedback gain, K is the feedforward gain, $$F = \int_0^1 \mu_1 e x_p \tag{6}$$

$$K = \int_0^1 \mu_2 e r \tag{7}$$

Wherein: 1μ, 2μ system for tracking error according to the response speed set by matrix coefficients.

By comparing the actual yaw angle to the wind deviation of the difference between information and optimal yaw angle (e) between the two wind deviations, then follow (6) and (7) of the adaptive law to correct the parameters of the controller, so that $x_p$ of the controlled object output as the output follows the reference model $x_m$.

In the controlled system, when the controlled object yaw system due to external reasons, such as wind speed and wind wake effects influence the impact parameters of the system leads to a change, it will result in an increased output error between the controlled object and the reference model output 5. At this time adaptive systems play a role in the control parameter input u again tuning a controller such that the output of the controlled object output again approaches the reference model. After transfer to the model reference adaptive controller, gain control signal u yaw drive, drive control yaw, bearing yaw to perform an action.

Yaw control execution system consists of a yaw bearing and a yaw drive. Yaw bearing inner and outer rings are connected with the sub-10 wind turbine tower and a cabin with bolts. Yaw bearings and gear rings with fused teeth are located on the yaw bearing inner ring, the engagement by force uniform and co pact structure. Yaw drive installed in the nacelle, the yaw motors and brakes, yaw small gear box, yaw pinion, the oil level gauge composition, and are integrally connected by bolts and internal splines, then together with the main frame and fan bolt member together. The yaw drive apparatus is generally provided with four groups, each one yaw drive device 15 is connected to the main frame by rotating the entire drive of the pinion gear with the ring gear to adjust backlash. Oil level via the oil pipeline and the oil drain plug, you can add the oil in the oil level when the oil level is lower than normal. Yaw gearbox design for planetary gear, the rear brake is located in the generator, when the yaw motor fails, the control system will send an electrical brake command, preventing lateral rotating motor.

The model reference adaptive controller calculates the control signal after u get a yaw, the yaw motor drive unit 20 will be operated in accordance with the value of the control signal u, the rotating pinion driven through a reduction gear box. Due to the small gear box, the yaw ring gear engages the large gear ring fastened by bolts on the wind turbine tower, the pinion gear will be surrounded by a large circle of rotation in order to stimulate the fan main frame rotation, until the position of the nacelle and the control signal given position coincidence.

Using this as a fan, a yaw drive mode adaptive control actuator is a simple structure 25.

Advantages include a reliable, small space occupation wheel drive torque, load response speed, with better system robustness. Through the implementation of wind yaw movement of the generator set cabin realizing the wind function, tracking the optimal yaw deviation of wind, reaching power generation optimization is possible.

As a result of the above technical solutions, the present invention is a wind yaw deviation adaptive control system to analyze the results of operations for the most advantage of wind deviation control objectives, using model reference adaptive control 5 ways to control the yaw system fan in the case of changes in the external environment, wind conditions, through the actual operation of the wind turbine optimum yaw deviation track to achieve a wind energy utilization and increase power generation, to improve the operational performance of the wind turbines are important.

Described above, the present invention is only the preferred embodiments but not to limit the present invention will be of any form, those skilled in the art using the above disclosed contents made little simple modification, equivalent variations or modifications 10, as full protection within the scope of the invention.

What is claimed is:

1. A turbine yaw control method, characterized by the steps of:

establishing a reference model wherein the reference model provides under different wind speeds an optimal yaw angle deviation of the wind; and controlling a turbine yaw by a model reference adaptive control system wherein the adaptive control system is configured for enabling a yaw control execution system input to adapt to an output of the wind turbine, so that a difference between an actual yaw angle deviation of the wind (Xp) and the optimum yaw angle deviation of the wind (Xm) is at a minimum wherein an adaptive control input from an equation of state u for control input (r) wherein $u=Fx_p+Kr$ is obtained for the adaptive control system with feedback gain F and feed forward gain K:

the step of obtaining an optimal yaw reference model as the reference model for a given wind speed under different wind shift angles is obtained by the steps of:

A1: getting wind signal D1, wind speed signal, a yaw angle signal D2 and power generation signal;

A2: getting wind direction in accordance with the signal D1, the yaw angle signal D2, and a calculated yaw angle of the wind deviation, d: $d=d_1-d_2$;

A3: analyzing the wind speed signal, generating power signal and yaw angle deviation of the wind, get different wind speeds to obtain optimal yaw maximum power output signal deviation angle to the wind;

the adaptive control system obtains an adaptive control input by the steps of:

B1: setting a yaw system state equation for wind turbines:

$$\dot{x}_p = -a_p x_p + b_p u \quad (1)$$

Which, $x_p$ is the actual yaw angle deviation of the wind, $\dot{x}_p$ is for micro, $x_p$ for differential, $a_p$, $b_p$ for a system matrix, u for an equation of state of a control input;

a reference model equation of state:

$$\dot{x}_m = -a_m x_m + b_m r \quad (2)$$

Which, $x_m$ for an optimal wind yaw angle deviation, $\dot{x}_m$ for $x_m$ differential, $a_m$, $b_m$ for a system matrix, r control input for the equation of state;

B2: parameter error is defined as follows:

$$e = x_m - x_p \quad (3)$$

According to the model reference adaptive control, by making the actual yaw angle deviation of wind $x_p$ and optimal wind yaw angle deviation e mx difference between the actual yaw angle and the optimal yaw angle is minimized to obtain adative control inputs:

$$u = Fx_p + Kr \quad (4)$$

Where F is a feedback gain, K is a feedforward gain, $$F = \int_0^i \mu_1 ex_p \quad (5)$$

$$K = \int_0^i \mu_2 er \quad (6)$$

wherein: 1μ, 2μ system for tracking error according to a response speed set by matrix coefficients.

2. A wind turbine yaw control system using the wind turbine yaw control method of claim 1, characterized in that it comprises:

reference modeling module for establishing a reference model, the reference model is optimal for a given wind speed under different yaw wind angle deviation;

adaptive yaw control system for the use of model reference adaptive control wherein the adaptive control system is configured for enabling a yaw control execution system input to adapt to an output of the wind turbine, so that the difference between the actual yaw angle deviation of the wind (Xp) and the optimum yaw angle deviation of the wind (Xm) is at minimum wherein an adaptive control input from equation of state for control input (r) wherein u=$Fx_p$+Kr is obtained for the adaptive control system with feedback gain F and feed forward gain K;

the reference modeling module obtains an optimal yaw for a given wind speed under different yaw wind angle deviation by the steps of:

A1: getting wind signal D1, wind speed signal, a yaw angle signal D2 and power generation signal;

A2: getting wind direction in accordance with the signal D1, the yaw angle signal D2, and a calculated yaw angle of the wind deviation, d: d=$d_1$−$d_2$;

A3: analyzing the wind speed signal, generating power signal and yaw angle deviation of the wind, get 15 different wind speeds to obtain optimal yaw maximum power output signal deviation angle to the wind;

the adaptive yaw control system obtains adaptive control input by the steps of:

B1: setting a yaw system state equations for wind turbines:

$$\dot{x} = -a_p x_p + b_p u \qquad (1)$$

Which, $x_p$ is an actual yaw angle deviation of the wind, $\dot{x}_p$ for micro, $x_p$ for differential, $a_p$, $b_p$ for a system matrix, u for an equation of state of a control input;

a reference model equation of state:

$$\dot{x}_m = -a_m x_m + b_m r \qquad (2)$$

Which, $x_m$ for optimal wind yaw angle deviation, $\dot{x}_m$ for $x_m$ differential, $a_m$, $b_m$ for a system matrix, r control input for the equation of state;

B2: parameter error is defined as follows:

$$e = x_m - x_p \qquad (3)$$

According to the model reference adaptive control, by making the actual yaw angle deviation of wind $x_p$ and optimal yaw angle deviation of wind e mx difference between the actual yaw angle deviation and the optimal yaw angle deviation is minimized to obtain adaptive control inputs:

$$u = F x_p + Kr \qquad (4)$$

Where F is a feedback gain, K is a feedforward gain, $$F = \int_0^i \mu_1 e x_p \qquad (5)$$

$$K = \int_0^i \mu_2 e r \qquad (6)$$

wherein: 1μ, 2μ system for tracking error according to a response speed set by matrix coefficients.

* * * * *